United States Patent
Koyasu et al.

(10) Patent No.: US 6,915,050 B2
(45) Date of Patent: Jul. 5, 2005

(54) IDENTIFICATION MEMBER IN SLOTS IN THE CORE OF AN OPTICAL FIBER CABLE

(75) Inventors: Osamu Koyasu, Narita (JP); Kazunaga Kobayashi, Sakura (JP); Satoru Shiobara, Yachiyo (JP); Ken Ohsato, Sakura (JP); Masashi Hara, Sakura (JP); Shimei Tanaka, Sakura (JP); Takeshi Honjyou, Sakura (JP); Keiji Ohashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/773,313

(22) Filed: Feb. 9, 2004

(65) Prior Publication Data

US 2004/0156601 A1 Aug. 12, 2004

(30) Foreign Application Priority Data

Feb. 12, 2003 (JP) .................................... P2003-033950

(51) Int. Cl.[7] .............................................. G02B 6/44
(52) U.S. Cl. ........................................ 385/105; 385/110
(58) Field of Search .................................. 385/100–110

(56) References Cited

U.S. PATENT DOCUMENTS

| 4,474,426 A | * | 10/1984 | Yataki .......................... 385/111 |
| 4,826,279 A | * | 5/1989 | Nishimura et al. ......... 385/102 |
| 4,842,438 A | * | 6/1989 | Bortolin et al. ............. 403/266 |
| 6,704,482 B2 | * | 3/2004 | Okada et al. ................ 385/113 |
| 6,715,932 B2 | * | 4/2004 | Kuroha et al. ................ 385/78 |
| 6,760,522 B2 | * | 7/2004 | Okada et al. ............... 385/109 |
| 2002/0034365 A1 | | 3/2002 | Vogelsang | |

FOREIGN PATENT DOCUMENTS

| JP | 06-060750 A | 3/1994 |
| JP | 2001-021730 A | 1/2001 |

* cited by examiner

*Primary Examiner*—Chandrika Prasad
(74) *Attorney, Agent, or Firm*—Sughrue Mion, PLLC (57) ABSTRACT

An optical fiber cable including a slotted core (3) having a suitable number of slots (7) and identification members (25) disposed in a designated slot (7B) of the slots (7) for identifying cable information.

37 Claims, 7 Drawing Sheets

IDENTIFICATION MEMBER IN SLOTS IN THE CORE OF AN OPTICAL FIBER CABLE

CROSS-REFERENCE TO RELATED APPLICATIONS

This application is based upon and claims the benefit of priority from Japanese Patent Application No. 2003-033950 filed on Feb. 12, 2003; the entire contents of which are incorporated herein by reference.

BACKGROUND OF THE INVENTION

This invention relates to an optical fiber cable for easily identifying a specific cable among a number of laid cables, a method for manufacturing the optical fiber cable and facilities used for the method.

For example, numerous optical fiber cables are laid in a trough. Central offices are disposed at intervals of 2.5 to 5 km. The numerous cables are terminated at main distribution frames in each central office. It is required to surely identify each cable when managing the cables terminated at the main distribution frames and removing one or some of the cables.

A conventional related cable identification method is that identification markings are marked on a sheath surface of each cable, or that at least one identification tag is attached to a tail end of each cable. The identification markings have cable information, such as the name of a manufacturer, the date of manufacture, a cable product name, and the cable length, being marked on the cable surface by ink, heat embossing, a laser beam or the like. The identification tag has, for example, cable information on the items as mentioned above, being marked on a thin metal plate to be attached to each cable, or being bound by a metal wire or wires or the like (e.g., refer to Japanese Patent Laid-Open No. Hei 6(1994)-60750).

According to another conventional cable identification method, laying-related information for an optical cable is converted into a 2-dimensional QR (Quick Response) code to be printed on the QR code printed paper, which is attached to the sheath of the optical cable. During maintenance, a code reader scans the QR code printed paper to read the recorded information at a laying site. The QR code printed paper has the optical cable information to be read out, similarly in place of a barcode, a magnetic card or an IC card (e.g., refer to Japanese Patent Laid-Open No. 2001-21730).

However, each of these cable identification methods suffers from deficiencies that reduce their effectiveness.

In the aforementioned identification method, the identification markings are marked on the surface of the cable in a longitudinal direction of the cable. Accordingly, as the number of characters and numerals in the identification markings increase, the longer section of cable, buried in a trough or in the ground, is needed to mark the identification markings. Removal of a trough cover or of soil and sand over a long section increases construction costs. Therefore, the entire length of the identification markings is should be 1 m or less. However, if the number of characters and numerals is limited to be marked in about 1 m, it is not realistic to mark all of the necessary information.

Additionally, the identification markings are subject to degrade illegibly due to aging effects or due to abrasion.

Further, if identification tags are used, they are required to be attached to a laid cable at regular intervals. Accordingly, the number of tags becomes enormous, increasing construction costs.

Moreover, as there is a limit to the number of characters and numerals marked on the identification tag, it is not realistic to mark all of the necessary information. The identification tag has characters and numerals marked thereon by embossing or the like. As well as the identification markings, the characters and numerals may be illegible due to aging effects or due to abrasion.

Still further, if the QR code printed paper or the like is used, attached to the sheath of the optical cable, it has less written information that the alternative methods, and can also be degraded due to aging effects or due to abrasion.

Cable identification is required to determine a specific cable among numerous cables during cable replacement work or removal work. However, if identification markings, an identification tag, QR code printed paper or a barcode becomes illegible, or if there are a plurality of cables with the identical or similar information, much time is consumed to identify the specific cable.

Further, if the other active optical fiber cable than the specific optical fiber cable to be removed is cut by mistake, the interruption of optical signals in the other active optical fiber cable for proper operation of terminating equipment and transmission of information may cause serious accidents.

SUMMARY OF THE INVENTION

The present invention has an object to provide an optical fiber cable which enables easy and reliable identification of a specific cable among a number of cables, a method of manufacturing the optical fiber cable, and facilities for the manufacturing the optical fiber cable.

The first aspect of the invention is directed to an optical fiber cable. The cable includes a slotted core having a plurality of slots. The cable includes identification members disposed in at least one of the slots for identifying cable information.

The plurality of slots formed in the slotted core have continuous and smooth loci over the entire slotted core length. Identification members are arranged at intervals over the entire cable length.

The cable may include a pair of induction wires, including parallel parts arranged at intervals over the entire length, disposed in one of the slots. The parallel parts are formed with a pair of two insulated conductors arranged parallel to each other. Identification members and the parallel parts exchange signals to each other.

The pair of induction wires include twist parts arranged between the parallel parts. The twist parts formed with a pair of two insulated induction conductors twisted with each other.

The identification members are positioned to the parallel parts, respectively.

The identification member includes a radio frequency identification (RFID) chip.

The second aspect of the invention is directed to a method of manufacturing an optical fiber cable. The cable includes the step of preparing a slotted core with a plurality of slots having continuous and smooth loci over the entire slotted core length. The cable includes the step of detecting one or more angular positions of the slots of the slotted core at a first axial position. The cable includes the step of synchronously responding to the angular positions to feed identification members into the designated slot at a second axial position distanced from the first axial position by one or more intervals of the length.

The method includes the step of forming a pair of induction wires with parallel parts at intervals of the length. The parallel parts are formed with a pair of insulated conductors parallel to each other. The method includes the step of accommodating the pair of induction wires in a designated slot of a slotted core. The method includes the step of detecting one or more angular positions of a first parallel part of the parallel parts. The method includes the step of synchronously responding to the first parallel part to feed identification members into the designated slot to a second parallel part of the parallel parts axially distanced form the first parallel part by one or multiple of intervals of the length.

The third aspect of the invention is directed to facilities for manufacturing an optical fiber cable. The facilities include a detector configured to detect one or more angular positions of slots of a slotted core at a first axial position. The slots have continuous and smooth loci over the entire slotted core length. The facilities include a first feeder configured to synchronously respond to the angular position to feed identification members into a designated slot at a second axial position distanced from the first axial position by one or multiple intervals over the entire cable length.

The detector detects an angular position of a first parallel part of parallel parts of a pair of induction wires. The parallel parts are formed with a pair of two insulated conductors arranged parallel to each other. The first feeder synchronously responds to the angular position to feed identification members into the designated slot to a second parallel part of the parallel parts axially distanced from the first parallel part by one or multiple intervals over the entire cable length.

The facilities include a second feeder configured to inject an adhesive to the identification members in the designated slot for securely fixing the identification members therein.

BRIEF DESCRIPTION OF THE ACCOMPANYING DRAWINGS

These and other objects, features and advantages will become clearer from the following description of exemplary embodiments of the invention, read in connection with the accompanying drawings in which.

DETAILED DESCRIPTION OF EXEMPLARY EMBODIMENTS

Exemplary embodiments of the invention are described below with reference to the accompanying drawings. The described exemplary embodiments are intended to assist the understanding of the invention, and are not intended to limit the scope of the invention in any way.

Figure 1:
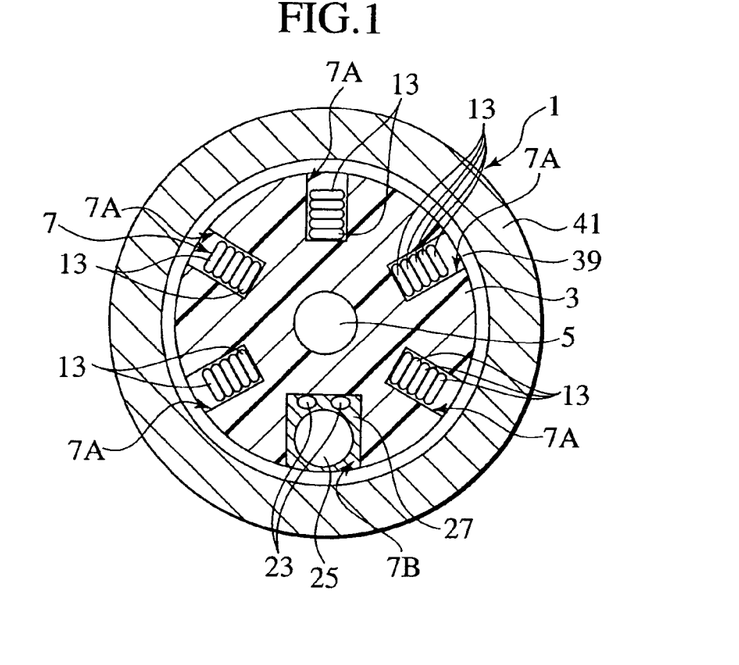
FIG. 1 is a sectional view showing an optical fiber cable according to an exemplary embodiment of the present invention.

Referring to FIG. 1, an optical fiber cable 1 is a slot-type cable. The cable 1 includes a slotted core 3 which is circular in section and long in length. The cable 1 includes a strength member 5 of a steel wire at the center of the slotted core. The cable 1 has six slots 7 on an outer peripheral surface of the slotted core 3. The slots 7 are arranged at equidistances along a longitudinal direction of the slotted core 3.

Figure 5:
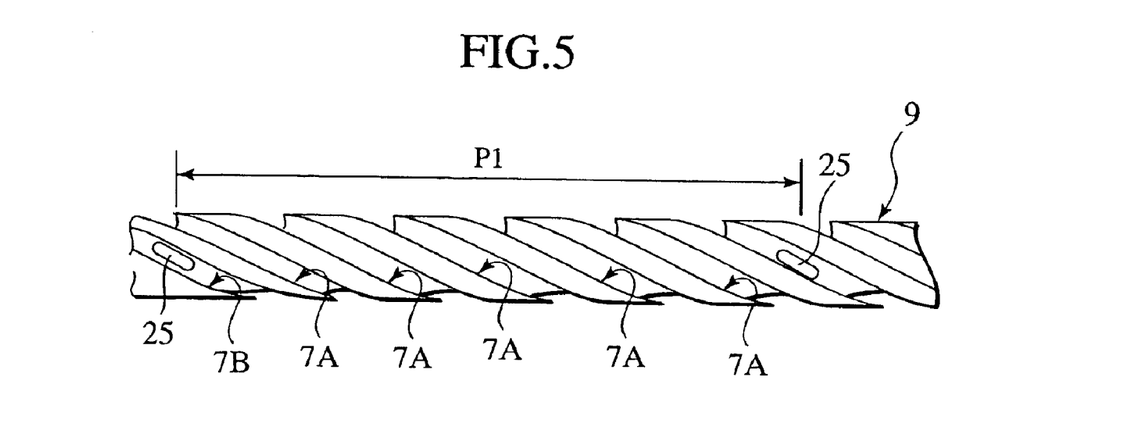
FIG. 5 is a perspective view partially showing a slotted core with helical slots in FIG. 1.
Figure 6:
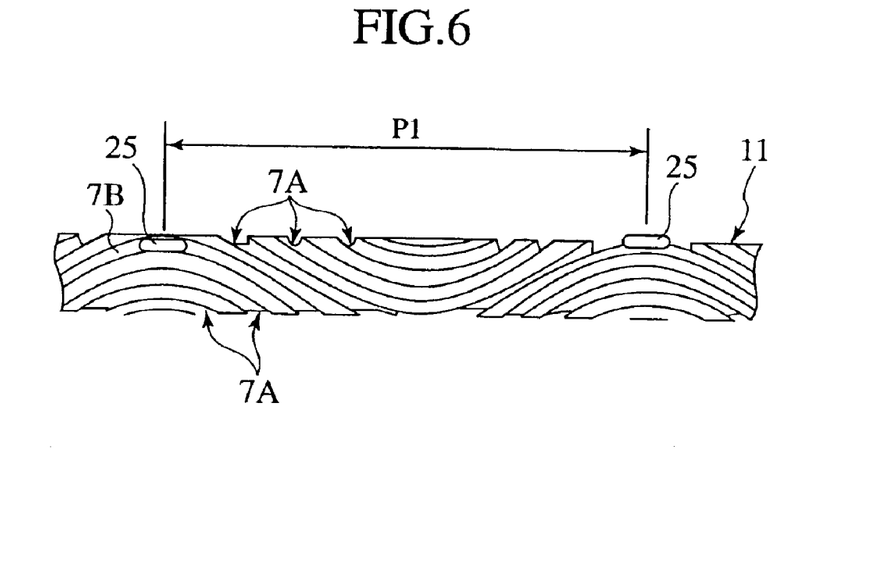
FIG. 6 is a perspective view partially showing a slotted core with alternating SZ slots in FIG. 1.

In FIG. 5, the slots 7 include so-called unidirectional helical slots 9. The slots 7 are formed helically in one rotational direction along the longitudinal direction of the slotted core 3, and are arranged at equidistances to one another. In FIG. 6, the slots 7 include so-called SZ slots 11. The slots 7 are formed along the longitudinal direction of the slotted core 3, with the rotational direction being reversed alternately clockwise and counterclockwise and arranged at equidistances to one another. The rotational direction of the SZ slots 11 are reversed at half the regular intervals of a cyclic length or a pitch P1. In this embodiment, the pitch P1 is, e.g., about 1 m.

Figure 2:
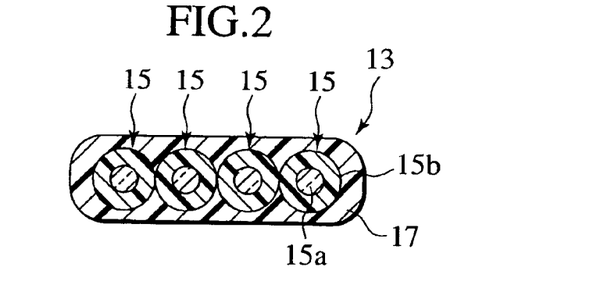
FIG. 2 is a sectional view of an optical fiber ribbon to be accommodated in the optical fiber cable of FIG. 1.

The cable 1 houses, for example, four optical fiber ribbons (hereinafter, referred to as optical fiber ribbon 13), in each of five slots 7A of the six slots 7. Optical fibers of 100 in total are housed in the five slots 7A. In FIG. 2, each optical fiber ribbon 13 includes four optical fibers 15 arranged in parallel. Each optical fiber 15 includes a glass fiber 15a and a coating 15b around the glass fiber 15a. Four optical fibers 15 have a common coating layer 17 made of resin around them 15. The optical fibers 15 and the common coating layer 17 are manufactured integrally in a ribbon configuration. The configuration of optical fibers to be housed in the slot 7A is not limited to the optical fiber ribbon 13, but other types of configurations may be used.

Figure 3:
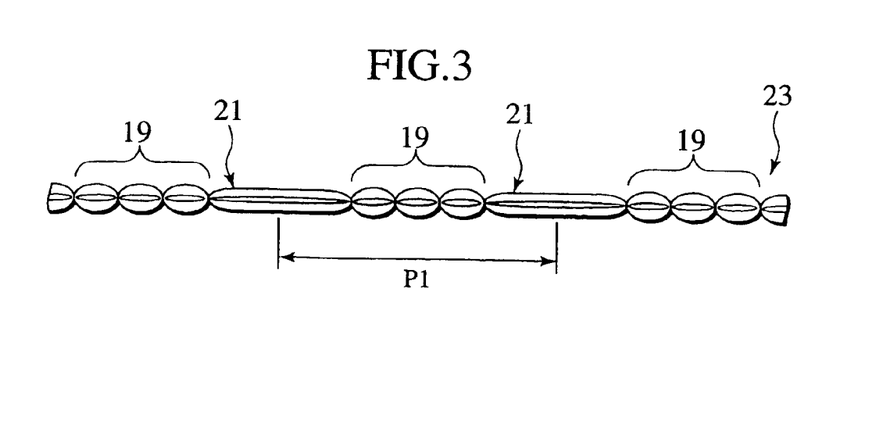
FIG. 3 is a partial plan view of a pair of induction wires in FIG. 1.

Referring to FIGS. 1 and 3, one designated slot 7B other than the slots 7A has a pair of induction wires 23 housed along the bottom of the slot 7B. The pair of induction wires 23 include a pair of insulated electric wires. The pair of induction wires 23 has twist parts 19 and parallel parts 21 alternately arranged at regular intervals. The pair of induction wires 23 is made so as to have parallel parts 21 at similar intervals to the pitch P1 of the slot 7B shown in FIGS. 5 and 6. According to this embodiment, one pitch P1 has a length of e.g., about 1 m. The twist parts 19 and the parallel parts 21 are electrically continuous so as to transmit signals. The parallel parts 21 mainly function as antennas and one of the parallel parts 21 exchanges information with the nearest RFID chip 25 by electromagnetic induction.

Figure 7:
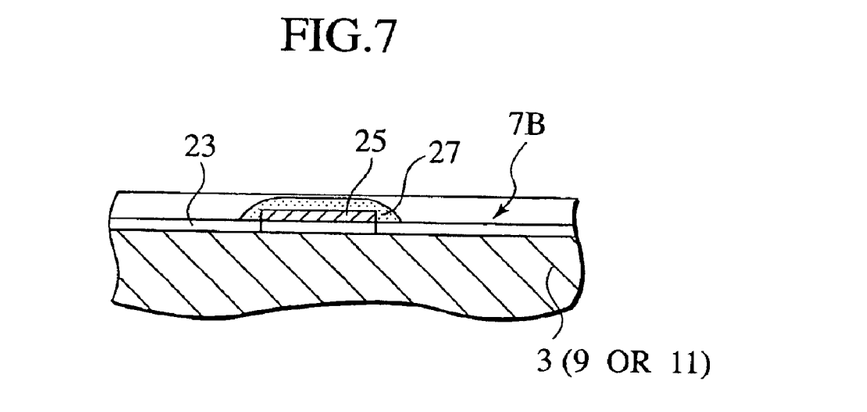
FIG. 7 is a schematic explanatory view of a state in which the RFID chip mounted in a designated slot of the slotted core is adhered thereto using an adhesive.

In FIGS. 5 and 6, radio frequency identification ("RFID") chips 25 are positioned at regular intervals of the pitch P1 in the designated slot 7B so as to coincide with the parallel parts 21 of the pair of induction wires 23. In FIG. 7, the RFID chips 25 are adhered to the designated slot 7B by an adhesive 27 such as a hot-melt resin, being fixed therein.

Figure 4:
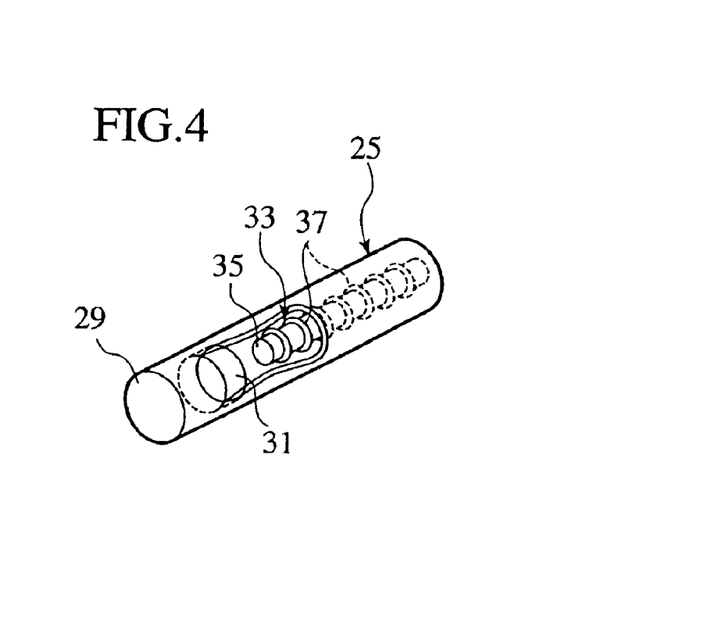
FIG. 4 is a schematic perspective view of a RFID chip in FIG. 1.

As shown in FIG. 4, each RFID chip 25 includes a cylindrical case 29 made of plastic. This case 29 has an IC (Integrated Circuit) chip 31 inside which stores cable information. The case 29 incorporates an antenna coil 33 electrically connected to the IC chip 31. The antenna coil 33 includes a straight rodlike or platelike magnetic core 35. The antenna coil 33 includes an insulated copper wire 37 as a coil main body, wound spirally around the magnetic core 35. Each of the RFID chips 25 has cable information stored in the IC chip 31, which is to be read out or written in through the antenna coil 33, using radio waves transmitted to and from a reader/writer by electromagnetic induction.

Referring to FIG. 1, slotted core 3 has a plurality of optical fiber ribbons 13 housed in each of slots 7A. Designated slot 7B houses the pair of induction wires 23 and the RFID chips 25 therein. In this state, the slotted core 3 has a wrapping 39, a plastic tape, applied around the outer periphery. The wrapping 39 has a sheath 41 of, e.g., PE (polyethylene) extruded on the outside. The cable has an outer diameter of 20 mmφ. The sheath may use a sheath material of PVC (polyvinyl chloride), a non-halogen flame retardant material, or an ecological material in place of PE.

Next, an application example of the optical fiber cable 1 is described.

Figure 12:
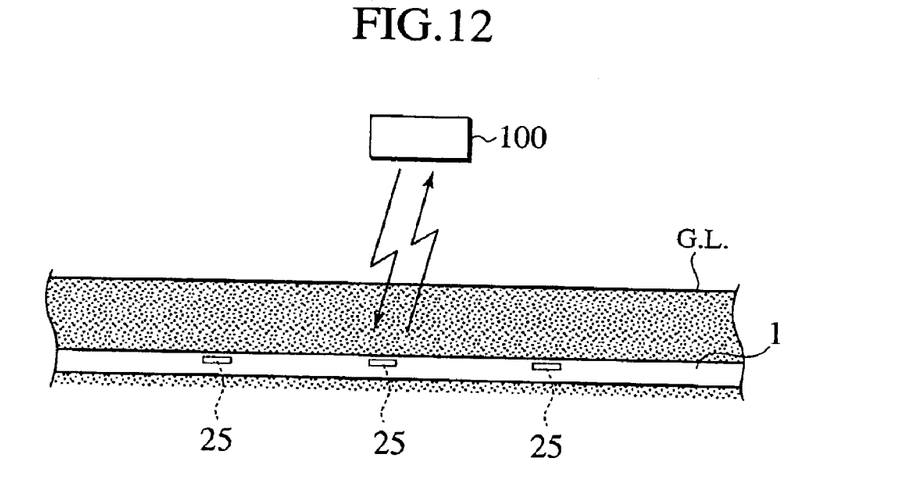
FIG. 12 is a schematic view showing an application example of the optical fiber cable of FIG. 1.

With reference to FIG. 12, for example, the optical fiber cables 1 are laid along a railroad. Control rooms are provided at intervals of 2.5 to 5 km along the railroad. The cables 1 are terminated at the fiber distribution frames of the control rooms.

It is necessary to identify each cable 1 when managing the cables 1 or removing one or some of the cables 1. When identifying each cable 1, the RFID chips 25 are arranged in each of the cable 1 at fixed intervals of, e.g., 1 m in a longitudinal direction of the cable 1. A reader/writer 100 retrieves cable information written in the RFID chips 25 by electromagnetic induction. The reader/writer 100 executes reading/writing on the IC chip 31 in the RFID chip 25. The information written in the RFID chip 25 is not lost over a period of time, and the reader/writer 100 easily identifies a specific cable 1 in a short time. This prevents the wrong active optical fiber cable 1 from being cut by mistake, and thereby reduces construction costs.

The pair of induction wires 23 are capable of simultaneously writing-in data in all the RFID chips 25. The RFID chips 25 coincide in position with the parallel parts 21 of the pair of induction wires 23. This arrangement allows writing signals to transmit to the nearest parallel parts 21 of the pair of induction wires 23. Moreover, the writing signals transmit to the other parallel parts 21 through the electrically continuous twist parts 19 in the longitudinal direction. Accordingly, the other parallel parts 21 are capable of simultaneously writing-in data in the corresponding RFID chips 25 by electromagnetic induction.

Designated slot 7B for the RFID chips 25 of the slotted core 3 is concaved in the optical fiber cable 1. This prevents an outer diameter of the cable from being greatly increased.

Next, a method for manufacturing the optical fiber cable 1 is described. Detailed description of the features of the optical fiber cable 1 already discussed will be omitted.

Figure 8:
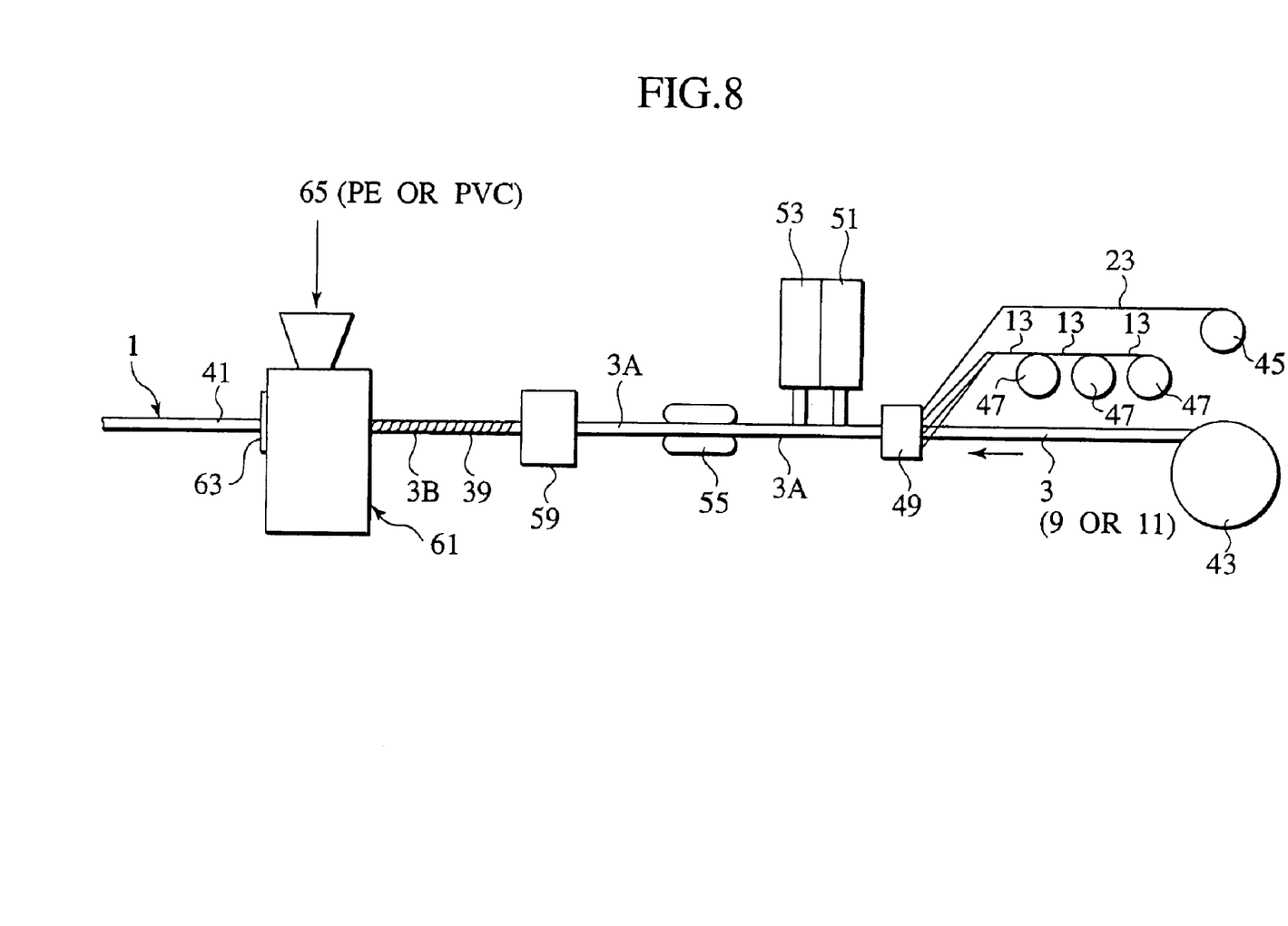
FIG. 8 is a schematic explanatory view showing a manufacturing process of the optical fiber cable of FIG. 1.

In FIG. 8, facilities include, in order from an upstream side, pay-off bobbins 43, 45, 47, a revolver 49, a RFID feeder 51, an injector 53, a puller 55, a tape winder 59, and an extruder 61.

Referring to FIG. 8 together with FIG. 1, the slotted core 3 is coiled on the pay-off bobbin 43. On the outer peripheral surface of the slotted core 3, the slots 7A, 7B are arranged along the longitudinal direction of the slotted core 3 at equidistances. The slots 7A, 7B are formed to have helical configurations of either a unidirectional or an alternating SZ directional way.

The pair of induction wires 23, including the alternating twist parts 19 and the parallel parts 21, are coiled on the pay-off bobbin 45. The interval between the parallel parts 21 of the pair of induction wires 23 is set to be equal to a cyclic pitch P1 of the slots 7A, 7B. The plurality of optical fiber ribbons 13 are also coiled on the respective bobbins 47.

Figure 9:
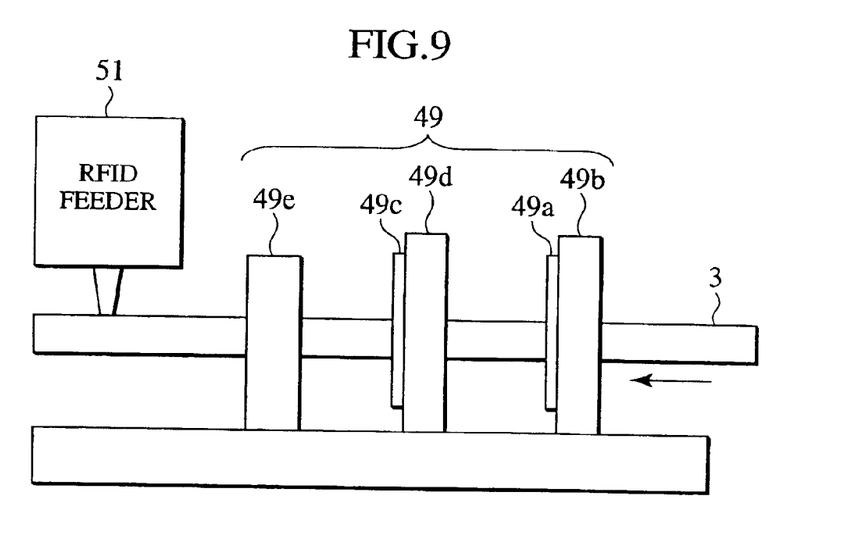
FIG. 9 is a schematic view showing a revolver and a RFID feeder in FIG. 8.

Referring to FIG. 9, the revolver 49 detects angular positions of the slots 7A, 7B of the slotted core 3. The revolver 49 controls timing for supplying the optical fiber ribbons 13, the pair of induction wires 23 and the RFID chips 25 in the slots 7A, 7B, respectively.

The revolver 49 includes first revolving disk 49c, 49d to revolve around the slotted core 3 while guiding the plurality of optical fiber ribbons 13 and the pair of induction wires 23 around the slotted core 3.

Figure 10A:
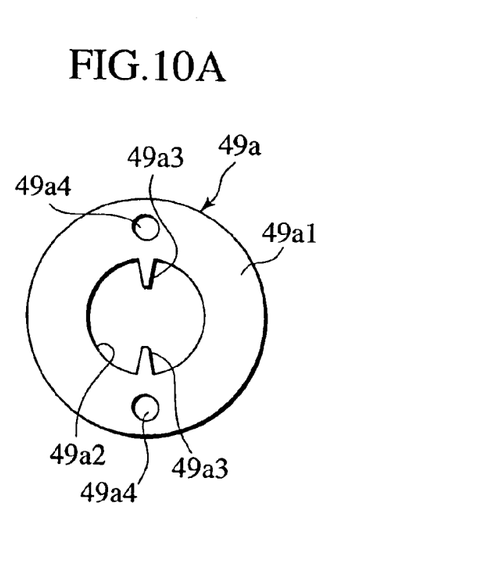
FIG. 10A is an elevation view showing a revolving disk for the RFID in FIG. 9.

The first revolving disk 49c together with an encoder 49d detect a rotational angle of the disk 49c. The disk 49c has six inner projections 49c3 being the same as that of the slots 7A, 7B. The projections 49c3 are matched with the slots 7A, 7B, respectively. The projections 49c3 are arranged at equal angles to one another with respect to the axis, and are protruded from the inner peripheral edge toward the center. The first revolving disk 49c is used to accommodate the optical fiber ribbons 13 and the pair of induction wires 23 in the slots 7A, 7B, respectively.

The first revolving disk 49c is each provided with a complex hole 49c2 in the center thereof, the complex hole being for the slotted core 3 to pass therethrough. Around the complex hole 49c2, a plurality of guide holes 49c4 are provided at equal intervals in a line feeding direction to guide the optical fiber ribbons 13 and the pair of induction wires 23 therethrough. The guide holes 49c4 are positioned radially outside of the projections 49c3, respectively.

Figure 10B:
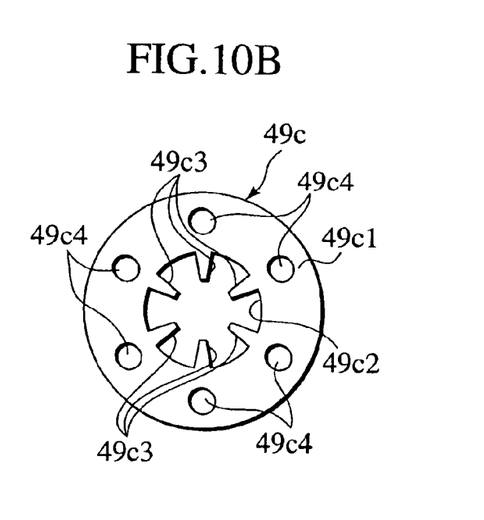
FIG. 10B is an elevation view showing a revolving disk for the pair of induction wires in FIG. 9.

The revolver 49 includes second revolving disk 49a separated therefrom by the cyclic pitch P1 upstream of the first revolving disk 49c. The second revolving disk 49a together with an encoder 49b detects a rotational angle of the disk 49a. The disk 49a has a complex hole 49a2 in the center thereof. The disk 49a has opposing two inner projections 49a3 protruding from the inner peripheral edge of the complex hole 49a2 toward the center. One of the projections 49a3 is set in the designated slot 7B. The disk 49a has two guide holes 49a4 at equal intervals in a line feeding direction to guide the pair of induction wires 23 therethrough. The guide holes 49a4 are positioned radially outside of the inner projections 49a3, respectively. One of the guide holes 49a4 guides the pair of induction wires 23. The second revolving disk 49a is used to accommodate the RFID chips 25 in the designated slot 7B.

In an alternative embodiment, the first and second revolving disks 49a and 49c may be integrated at a position.

The revolver 49 has an assembling mouthpiece 49e on a downstream side of the first revolving disk 49c. The assembling mouthpiece 49e is disposed apart from the disk 49c by the cyclic pitch P1. The arrangement of the slots 7A, 7B at the assembling mouthpiece 49e is identical to that at the disk 49c.

The revolver 49 includes a RFID feeder 51 for feeding the RFID chips 25 downstream thereof (left in FIG. 8).

Figure 11A:
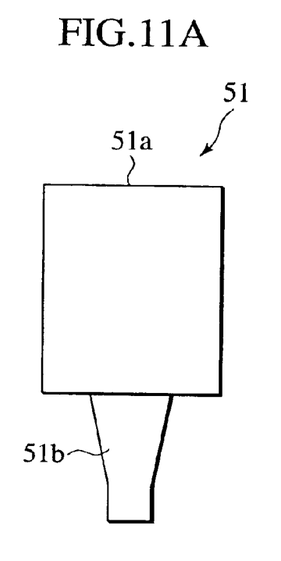
FIG. 11A is a side view showing the RFID feeder in FIG. 9.
Figure 11B:
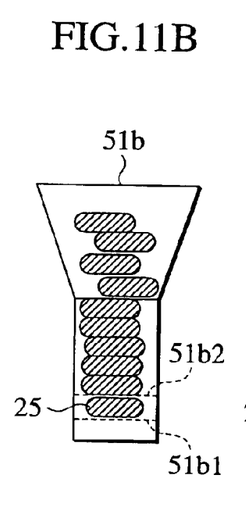
FIG. 11B is a front view showing a discharge nozzle in FIG. 11A.
Figure 11C:
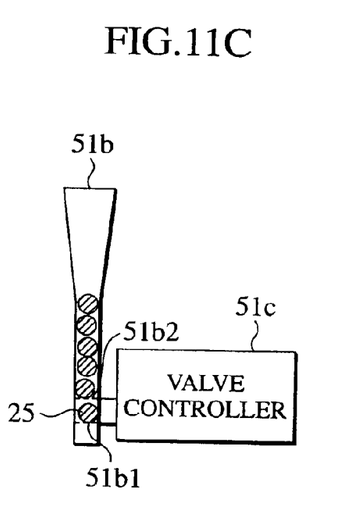
FIG. 11C is a side view showing the discharge nozzle of FIG. 11A and a controller.

Referring to FIGS. 11A to 11C, the RFID feeder 51 includes a container 51a for containing the RFID chips 25. The RFID feeder 51 includes a discharge nozzle 51b for discharging the RFID chips 25. The discharge nozzle 51b is disposed apart from the second revolving disk 49a by a multiple of the cyclic pitch P1.

The discharge nozzle 51b includes a discharge valve 51b1 and a stop valve 51b2 inside. The RFID feeder 51 includes a controller. 51c for electromagnetically controlling the valves 51b1, 51b2.

The RFID feeder 51 has an injector 53 for injecting, e.g., an adhesive downstream thereof. In FIG. 8, the injector 53 is positioned above the slotted core 3. The injector 53 injects the adhesive 27 to adhere the RFID chips 25 to the designated slot 7B. The injector 53 works as an adhesive feeder.

According to the aforementioned facilities, the slotted core 3 is prepared and payed off from the bobbin 43. The plurality of optical fiber ribbons 13 are payed off from the bobbins 47. The pair of induction wires 23 are payed off from the bobbin 45. The slotted core 3, the optical fiber ribbons 13 and the pair of induction wires 23 are fed to, e.g., the revolver 49 as an assembling line which is positioned downstream in FIG. 8. Here, the designated slot 7B for the pair of induction wires 23 is positioned at the top (phase 0°). The parallel parts 21 of the pair of induction wires 23 are positioned so as to be laid in the designated slot 7B. The parallel parts 21 of the pair of induction wires 23 are arranged at cyclic pitches P1 of, e.g., about 1 m each. The cyclic pitches of the slot 7B are also the same as pitches P1 of about 1 m each.

The revolver 49 guides the optical fiber ribbons 13 into the slots 7A, and the pair of induction wires 23 into the bottom of the slot 7B.

The slots 7 with the SZ directions are reversed in a rotational direction at a preset angle. The projections 49c3 of the disk 49c are set in the slots 7A, 7B, respectively. When the SZ slotted core 11 is advanced, the disk 49c follows the tracks of the slots 7A, 7B to be rotated. Accordingly, the first revolving disk 49c is rotated unidirectionally clockwise or counterclockwise, or alternately reversing the rotation clockwise and counterclockwise in accordance with a configuration of the slotted core 9 or 11.

The encoder 49d detects rotational angles of the projections 49c3 of the disk 49c to determine positions for guiding the optical fiber ribbons 13 and the pair of induction wires 23 into the slots 7A and 7B, respectively.

The assembling mouthpiece 49e assembles the plurality of optical fiber ribbons 13 rotated by the first revolving disk 49c in such a manner as to smoothly lead the optical fiber ribbons 13 into the corresponding slots 7A. Thus, the plurality of optical fiber ribbons 13 and the pair of induction wires 23 are accommodated in the corresponding slots 7A, 7B, respectively.

Meanwhile, in the second revolving disk 49a, the projection 49a3, the designated slot 7B and the parallel parts 21 are set to positions corresponding to the top (phase 0°) in FIG. 8. At this time, the designated slot 7B and the parallel parts 21 are positioned at a phase of 0° at the RFID feeder 51. That is, when the designated slot 7B and the parallel parts 21 pass through the second revolving disk 49a at the phase of 0°, the RFID chips 25 are discharged from the RFID feeder 51. Thus, the RFID chips 25 are housed in the designated slot 7B in coincidence with the parallel parts 21.

Specifically, signals are generated when the second revolving disk's projection 49a3 passes directly above (phase 0°) the slot 7B. The controller 51c sends the control signals to open the discharge valve 51b1. At this time, the stop valve 51b1 is closed. This allows one RFID chip 25 to be discharged from the discharge nozzle 51b into the designated slot 7B. After discharging the RFID chip 25, the discharge valve 51b1 is closed while the stop valve 51b2 is opened. Thus, the next RFID chip 25 reaches the discharge valve 51b1 by its own weight. The stop valve 51b2 is closed again. By repeating this operation, the RFID chips 25 are housed in the designated slot 7B at the regular intervals of P1.

In FIG. 8, subsequently, the injector 53 injects, e.g., the adhesive 27 to the RFID chips 25 accommodated in the designated slot 7B. The adhesive 27 adheres and fixes the RFID chips 25 to the pair of induction wires 23 in the designated slot 7B (see FIG. 7).

The slotted core 3 is pulled by the puller 55 on the downstream side (left in FIG. 8) of the injector 53. Thus, the RFID feeder 51 and the injector 53 are positioned more stably with the predetermined positions of the designated slot 7B.

After a slotted core 3A, in which the RFID chips 25 are fixed at predetermined positions, passes through the puller 55, the plastic tape wrapping 39 is applied to the outside of the slotted core 3A by the tape winder 59, forming a wrapped cable core 3B. Thereafter, the wrapped cable core 3B is fed to the extruder 61. PE 65 is extruded to cover the wrapped cable core 3B through the head 63 of the extruder 61. Thus, the sheath 41 is formed on the wrapped cable core 3B, being a sheathed cable. The sheathed cable is cooled by a cooling trough such as a circulating cooling water tank (not shown). In this way, the optical fiber cable 1 is manufactured.

According to the present invention, the identification members are arranged in the optical fiber cable at regular intervals in the longitudinal direction of the optical fiber cable. Therefore, the cable information written in the identification members can be easily retrieved by, e.g., the reader/writer. This prevents the wrong active optical fiber cable from being cut by mistake, thus reducing construction costs.

The identification members and the parallel parts of the pair of induction wires are arranged to coincide with each other. This arrangement enables the pair of induction wires to transmit writting-in signals to the parallel parts, allowing simultaneous writing of data in all the identification members.

As the identification members are disposed in the designated slot of the slotted core, the outer periphery of the optical fiber cable can be round shaped. This prevents the outer diameter of the cable from being greatly increased.

The pair of induction wires is constituted with a pair of two insulated conducting wires in which the twist parts and the parallel parts are alternately repeated at regular intervals. Thus, the identification members can be easily arranged so as to coincide with the parallel parts of the pair of induction wires. As a result, written signals can be transmitted to all the parallel parts by the pair of induction wires, allowing simultaneous writing of data in all the identification members.

The revolver can guide the pair of induction wires and the optical fiber ribbons into the respective slots of the slotted core clockwise or counterclockwise in accordance with the rotational directions of the plurality of slots. Accordingly, the pair of induction wires are securely accommodated in the designated slot. Moreover, the RFID feeder feeds the identification members to the parallel parts of the pair of identification wires, and the injector injects the adhesive to the identification members. Therefore, information storage elements can be arranged and fixed in the optical fiber cable at regular intervals in the longitudinal direction of the optical fiber cable.

Although the invention has been described above by reference to certain exemplary embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An optical fiber cable comprising:
    a slotted core comprising a plurality of slots; and
    an identification member disposed in a designated one of the plurality of slots for identifying cable information.
2. The optical fiber cable according to claim 1, wherein the plurality of slots formed in the slotted core have continuous and smooth loci over the entire slotted core length.
3. The optical fiber cable according to claim 1, wherein a plurality of the identification members are disposed in the designated slot.
4. The optical fiber cable according to claim 3, wherein the plurality of identification members are arranged at intervals over the entire cable length.
5. The optical fiber cable according to claim 3, wherein a plurality of the identification members are also arranged in a second designated slot of the plurality of slots.
6. The optical fiber cable according to claim 3, wherein the plurality of slots have continuous and smooth loci over the entire slotted core length, wherein the identification members are arranged at intervals over the entire cable length.
7. The optical fiber cable according to claim 6, wherein the identification members are arranged at intervals over the entire cable length.
8. The optical fiber cable according to claim 3, further comprising:
    a pair of induction wires disposed in the designated one of the plurality of slots, each comprising parallel parts, with two insulated conductors arranged parallel to each other, arranged at intervals over the entire cable length.
9. The optical fiber according to claim 8, wherein individual parallel parts of the respective induction wires are arranged adjacent to individual ones of the identification members arranged at intervals over the entire cable length.
10. The optical fiber according to claim 9, wherein the parallel parts and the identification members exchange signals with each other.
11. The optical fiber cable according to claim 8, wherein the pair of induction wires further comprise twist parts, formed with a pair of two insulated conductors twisted with each other, arranged between the parallel parts.
12. The optical fiber cable according to claim 1, wherein the identification member comprises a radio frequency identification (RFID) chip.
13. The optical fiber cable according to claim 1, wherein the RFID chip comprises a magnetic core and antenna coil arranged within a case.
14. The optical fiber cable according to claim 1, wherein the plurality of slots are arranged in a unidirectional helical direction.
15. The optical fiber cable according to claim 1, wherein the plurality of slots are arranged in an alternating SZ helical direction.
16. The optical fiber cable according to claim 1, wherein the identification member is retained in the designated one of the plurality of slots by an adhesive material.
17. The optical fiber cable according to claim 4, wherein the intervals between respective ones of the plurality of identification members are constant.
18. A method of manufacturing an optical fiber cable, comprising:
    preparing a slotted core with a plurality of slots having continuous and smooth loci over the entire slotted core length;
    detecting an angular position of a designated one of the plurality of slots at various axial positions of the optical fiber cable; and
    feeding a first identification member into the designated slot at a first axial position when the detected angular position matches a predetermined value.
19. The method according to claim 18, wherein the predetermined value is 0°.
20. The method according to claim 18, further comprising:
    feeding a second identification member into the designated slot at a second axial position different from the first axial position when the detected angular position again matches the predetermined value.
21. The method according to claim 20, wherein the predetermined value is 0°.
22. The method according to claim 20, further comprising:
    forming a pair of induction wires, formed with a pair of insulated conductors parallel to each other, with a plurality of parallel parts at intervals along its length; and
    guiding the pair of induction wires in the designated slot; wherein
    first and second parallel parts of the plurality of parallel parts are arranged adjacent to the first and second axial positions of the optical fiber, respectively.
23. The method according to claim 22, wherein the predetermined value is 0°.
24. The method according to claim 18, wherein the plurality of slots are arranged in a unidirectional helical direction.
25. The method according to claim 18, wherein the plurality of slots are arranged in an alternating SZ helical direction.
26. The method according to claim 18, further comprising detecting an angular position of a second designated one of the plurality of slots to feed additional identification members thereto.
27. The method according to claim 18, further comprising applying an adhesive to the first identification member to fix it in the designated slot at the first axial position.
28. Facilities for manufacturing an optical fiber cable, comprising:
    a detector configured to detect an angular position of a designated one of a plurality of slots arranged on a slotted core of an optical cable at various axial positions of the optical cable, with the slots having continuous and smooth loci over the entire slotted core length; and
    a first feeder configured to feed a first identification member into the designated slot at a first axial position when the detected angular position matches a predetermined value.
29. The facilities according to claim 28, wherein the predetermined value is 0°.
30. The facilities according to claim 28, wherein the first feeder is also configured to feed a second identification member into the designated slot at a second axial position different from the first axial position when the detected angular position again matches the predetermined value.

31. The facilities according to claim 30, wherein the predetermined value is 0°.

32. The facilities according to the claim 30, further comprising a revolver configured to feed a pair of induction wires into the designated slot, wherein the pair of induction wires comprise a pair of induction wires formed with a pair of insulated conductors parallel to each other, with a plurality of parallel parts at intervals along its length; and first and second parallel parts of the plurality of parallel parts are arranged adjacent to the first and second axial positions of the optical fiber, respectively.

33. The facilities according to claim 32, wherein the predetermined value is 0°.

34. The facilities according to claim 28, wherein the plurality of slots are arranged in a unidirectional helical direction.

35. The facilities according to claim 28, wherein the plurality of slots are arranged in an alternating SZ helical direction.

36. The facilities according to claim 28, wherein the detector is also configured to detect an angular position of a second designated one of the plurality of slots to feed additional identification members thereto.

37. The facilities according to claim 28, further comprising:

a second feeder configured to inject an adhesive to the first identification member in the designated slot for securely fixing the identification member therein.

* * * * *